Sept. 3, 1963 L. J. BAUGER ETAL 3,102,392
COMBUSTION EQUIPMENT FOR JET PROPULSION UNITS
Filed April 14, 1960 5 Sheets-Sheet 1

INVENTORS
Louis Jules Bauger
Armand Jean-Baptiste Lacroix
Pierre Marcel Phelipon
By Watson, Cole, Grindle & Watson

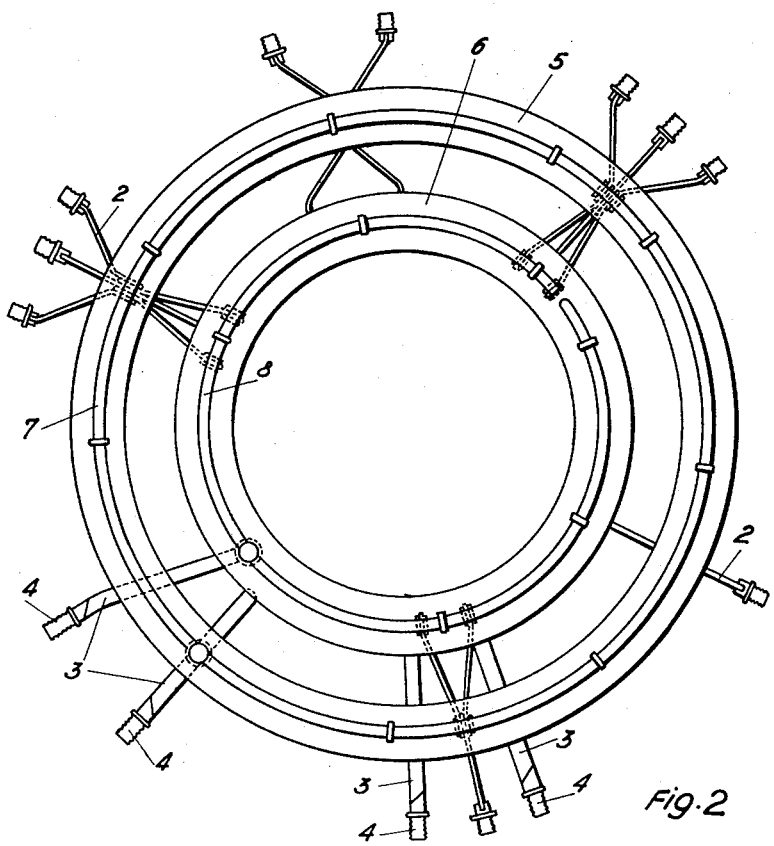
Fig. 2
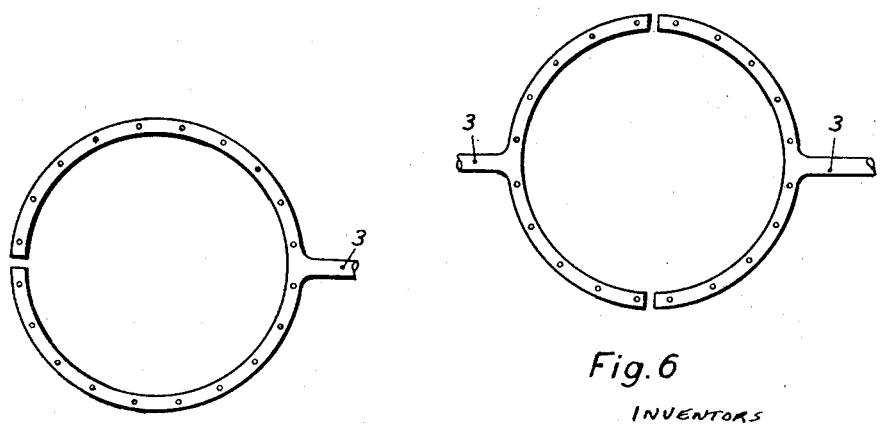
Fig. 5
Fig. 6

Sept. 3, 1963  L. J. BAUGER ETAL  3,102,392
COMBUSTION EQUIPMENT FOR JET PROPULSION UNITS
Filed April 14, 1960  5 Sheets-Sheet 3
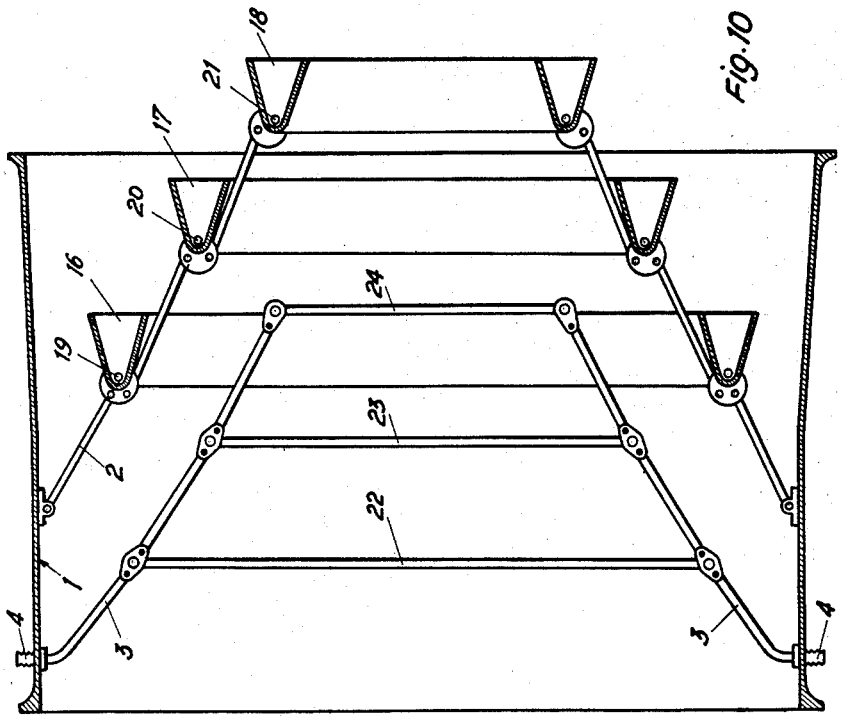
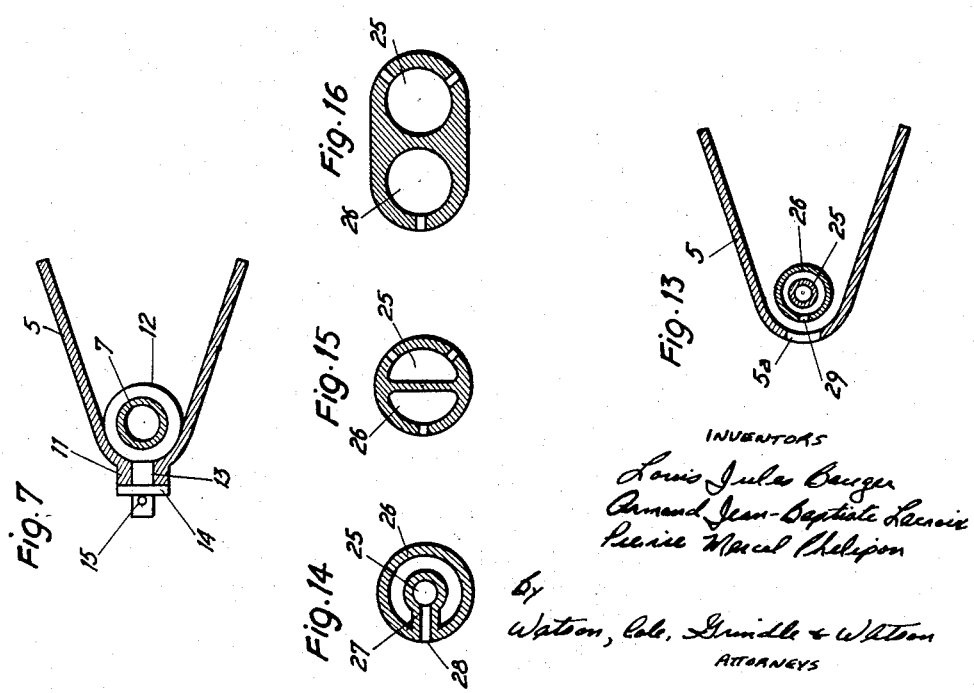

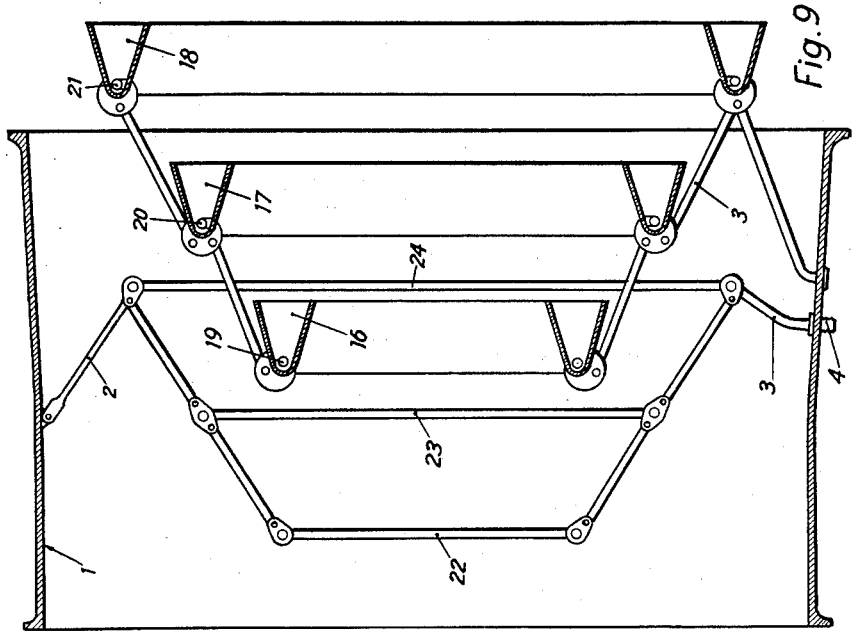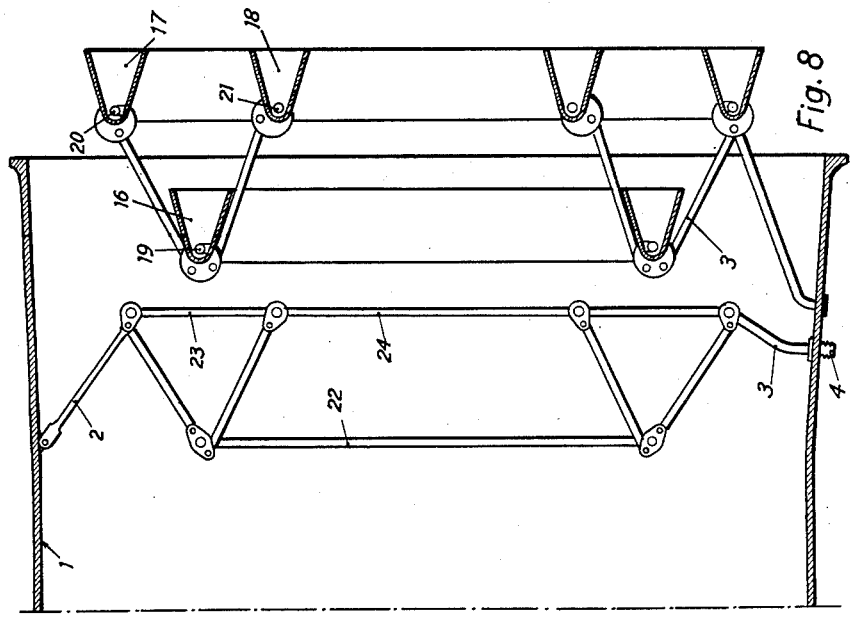

Sept. 3, 1963 L. J. BAUGER ETAL 3,102,392
COMBUSTION EQUIPMENT FOR JET PROPULSION UNITS
Filed April 14, 1960 5 Sheets-Sheet 5
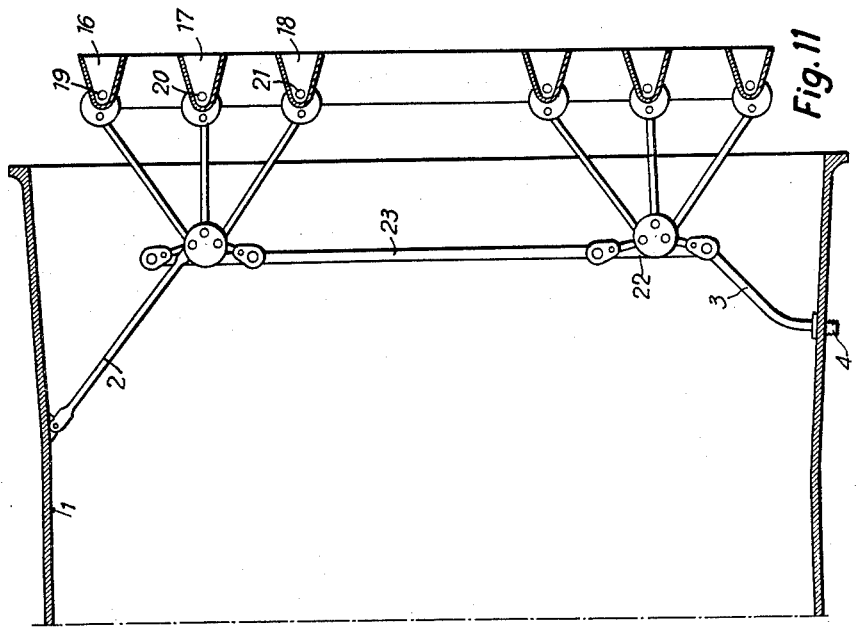
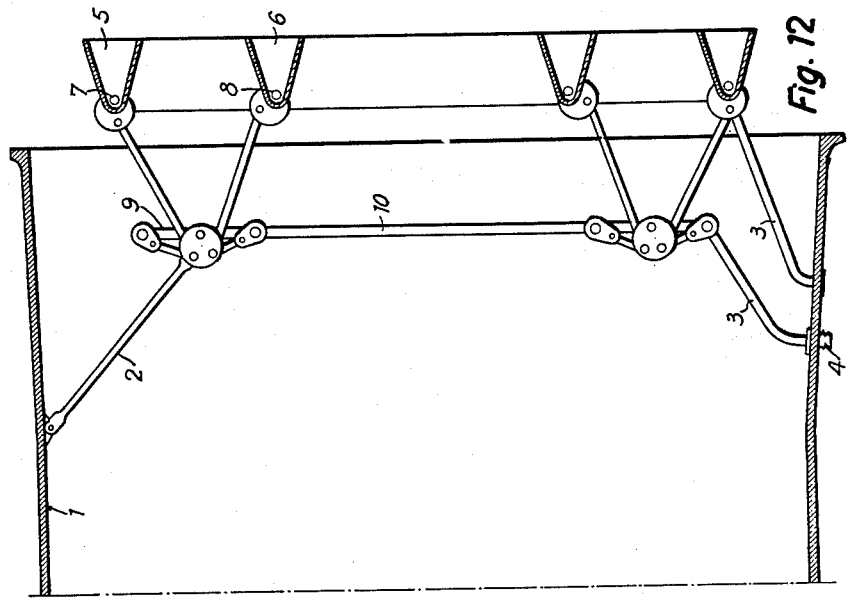

United States Patent Office 3,102,392
Patented Sept. 3, 1963

3,102,392
COMBUSTION EQUIPMENT FOR JET
PROPULSION UNITS
Louis Jules Bauger, Vanves, Armand Jean, Baptiste Lacroix, Itteville, and Pierre Marcel Phelipon, Dammarieles-Lys, France, assignors to Societe Nationale d'Etude et de Construction de Moteurs d'Aviation, Paris, France, a company of France
Filed Apr. 14, 1960, Ser. No. 22,281
Claims priority, application France Apr. 21, 1959
3 Claims. (Cl. 60—39.72)

It is at present required of turbo-jet engines used for the equipment of fighter aircraft that the thrust developed by said engines should momentarily be increased in different cases of flight: on take-off to diminish the rolling distances, in climbing in order to reach combat altitude in the minimum of time, in flight in order to achieve high speeds.

The means used consist in re-heating the gases issuing from the turbine, by burning a certain quantity of fuel in the jet pipe.

However the high thrusts on take-off, and the ever greater altitudes and speeds of flight lead to reheat devices capable of operating between wide richness limits.

All flight cases are usually satisfied by supplying a re-heat jet pipe with a large number of injectors supplied with fuel by distribution racks outside the pipe, and by disposing flame-stabilising obstacles in the interior, the obstruction ratio of which is very high.

In operation with re-heat extinguished, the injector-stablisier assembly gives a high total pressure loss and correlatively a significant loss of thrust.

On the other hand at intermediate operating rates with re-heat lit or with full load at high altitude, the injection pressure diminishing considerably, the output and the stability of the combustion are then greately diminished.

By an appropriate regulation it is possible to set in operation either all the injectors in the case of maximum thrust on the ground, or part of the injectors for altitude operation or operation on the ground with reduced load. The regulation system is obviously complex. This conventional device is used in the majority of turbo-jet engines equipped with re-heat; it is heavy and necessitates for the feeding of the injectors an equal number of pipes for connection to the feed racks. These pipes are often the cause of leakages of fuel, either through the connections or through breaks.

Finally the injectors are generally radial injectors which give rise to rich zones of combustion and to poor zones of combustion, causing low combustion outputs, instability and vibrations in the jet-pipe. It is well known that the injection of fuel through circular racks is preferable from this point of view.

We have studied and perfected an original re-heat device which, while avoiding the drawbacks of the conventional systems, is capable of satisfying the requirements of modern fighters. It effects the delivery of fuel by means of coaxial circular injection racks associated with means for creating a turbulent zone.

This device comprises the combination of annular flame-holders of V-section, each containing an annular fuel-injection rack delivering in counter-current through apertures formed at the point of the V, with annular injection racks separate from and placed upstream of said flame-holders so as to wash them in the wake generated by said upstream racks.

The invention is illustrated by way of example in the accompanying drawings in which:

FIGURE 2 is a view thereof projected on a plane perpendicular to the axis.

FIGURES 4, 5 and 6 are diagrams of three different arrangements of injection racks.

FIGURE 7 is a view similar to that according to FIGURE 3, showing a constructional detail.

FIGURE 8 to 12 represent examples of arrangements of flame holders and injection racks.

FIGURE 13 is a section showing a flame-holder containing a double injection rack.

FIGURE 14 is a section, on a larger scale, along a plane slightly offset from that of the preceding FIGURE.

FIGURES 15 and 16 are views similar to FIGURE 14, showing two variants of double racks.

Figure 1:
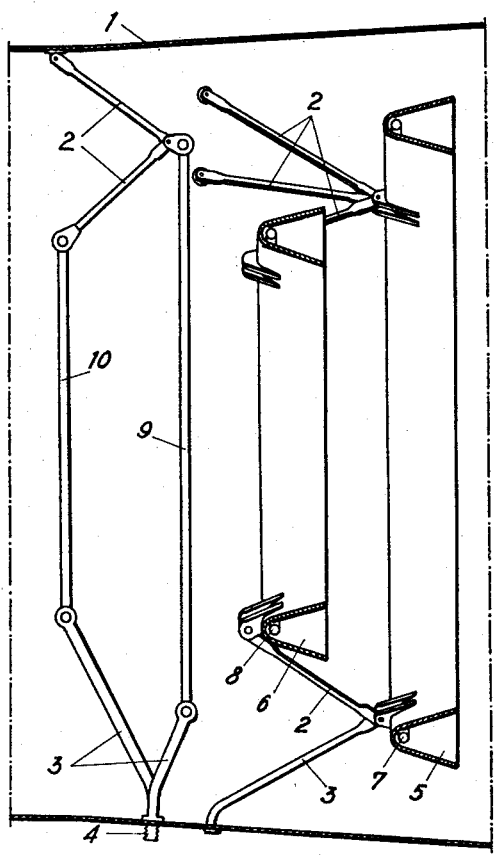
FIGURE 1 is a diagrammatic section along an axial plane of one form of embodiment of the invention.

In the example according to FIGURES 1 and 2, there is represented a part of the ejection duct or channel of a turbo-jet engine, on the wall 1 if which there is mounted a device in accordance with the invention, through the intermediary of small connecting rods such as 2 or of pipes such as 3 terminating in connections 4.

This device comprises two circular coaxial annular flame-holders 5 and 6, each carrying a fuel-injection rack 7 or 8.

These flame-holder rings are constituted by angle-pieces of V-section, the angle of aperture of which defines the magnitude of the obstruction due to the rings, that is to say the turbulence necessary for obtaining a stable combustion at all rates of flow in the duct. This angle is related to the rate of re-heat which it is desired to obtain.

The circular racks 7 and 8 situated in the point of the V of the rings are pierced with a certain number of orifices the diameter of which is determined in such manner that under the fuel pressure given by the pump they ensure the delivery of fuel necessary for the re-heat.

Figure 3:
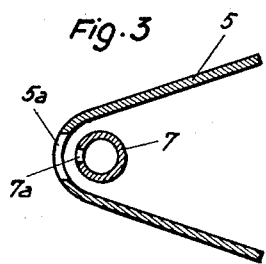
FIGURE 3 is a section, on a larger scale, of a flame-holder.

The leading edge of the rings, that is to say the point of the V, is provided with apertures such as 5a (FIGURE 3), through which the injection orifices such as 7a formed in the racks atomise the fuel. Thus the fuel injection is effected in counter-current.

The apertures 5a pierced in the leading edge have the essential object of introducing air into the slipstream created by the rings. They can be of circular, rectangular or other form.

Upstream of the flame-holder rings 5 and 6 there are disposed two coaxial circular racks 9 and 10 (see FIGURE 1) pierced with fuel-injection orifices. Said racks introduce the complementary quantity of fuel into the current. The orifices of said racks are oriented in such fashion that the fuel is injected in counter-current.

The diameter of the upstream racks 9, 10 is in relation with the diameter of the flameholder rings 5, 6. In general the diameter of the racks is less than that of the rings since the residual rotation of the gases at the exit from the turbine has the consequence of centrifuging the fuel injected by one upstream rack and of bringing it to the diameter of the associated flame-holder ring.

Figure 4:
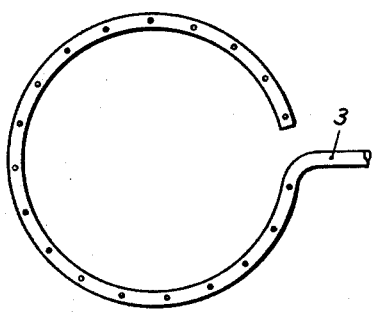

The fuel suply to the injection racks 7, 8, 9 and 10 can be effected in three different fashions represented in FIGURES 4, 5 and 6.

The first represents the supply to the rack through a single fuel inlet, the rack being continuous.

The second represents the supply to the rack through a single fuel inlet with two half-racks. This appears the most practical.

Finally the third represents the supply to the rack through two opposite fuel inlets. This is the best solution, but it complicates the piping outside the duct.

The fixing of the fuel-injection racks 7, 8 inside the V of the rings 5, 6 is conceived in such fashion that in operation the relative displacement of the rack in relation to the ring can be effected freely. In fact the rack is constantly cooled by the fuel or by the scavenging air, while the ring is subjected to the radiation of the flame. On the other hand the material constituting them is different. In these circumstances the expansions are not the same, and a relative displacement of the two parts must be able to occur.

FIGURE 7 shows a securing arrangement which allows a peripheral sliding of the rack 7, relative to the ring 5 and to fasteners 12 supporting said rack, and also any casual pivoting of a fastener and of the portion of the rack adjacent said fastener, relative to and about an axis parallel to the axis of said ring. For this purpose, sockets 11 are welded at several points spaced along the leading edge of the ring; annular fasteners 12 have a bore receiving the rack 7 with a diametral clearance just sufficient to permit a free relative sliding of these parts; the fasteners 12 are each pivoted on a socket 11 about an axis parallel to the ring axis by means of a nipple 13 which passes through a bore of said socket and are secured to the ring by means of a support washer 14 and a cotter 15.

In the example according to FIGURES 1 and 2, the number of flame-holder rings each associated with an upstream rack is two, and the relative arrangement of these is such that the inner ring or the ring of small diameter 6 is upstream of the outer ring or ring of large diameter 5. It is however quite apparent that this number and this relative disposition are in no way limitative.

FIGURES 8, 9, 10 and 11 show modified assemblies with three flame-holder rings 16, 17, 18 comprising internal racks 19, 20, 21, with which there are associated upstream racks 22, 23, 24.

The arrangement according to FIGURE 8 discloses two concentric flame-holder rings 17, 18, situated in one and the same transverse plane, and one burner ring 16 of diameter intermediate between those of the rings 17 and 18, coaxial and situated upstream of these. A similar configuration applies to the upstream racks 22, 23, 24.

In FIGURE 9, the flame-holder rings 16, 17, 18 and their upstream racks 22, 23, 24 have diameters increasing in the direction of flow. On the other hand, in FIGURE 10, the diameters decrease progressively. Finally in FIGURE 11 the three rings are in one and the same transverse plane, and are only associated with two upstream racks 22 and 23.

FIGURE 12 also shows an arrangement of flame-holder rings in one and the same plane, the number here being limited to two.

It is obviously possible to conceive other relative arrangements and a number of flame-holder rings greater than three.

When the aircraft is climbing at constant Mach number, the delivery of the fuel into the injection racks decreases in accordance with a law as a function of the altitude. The fuel-injection pressure decreases as the square of the delivery. The result is that at altitude the injection pressures are extremely low. The penetration and atomisation of the fuel become poor, the stability and the combustion efficiency decrease rapidly.

In order to ameliorate this drop in characteristics of the combustion, we have conceived a device derived from the preceding system by the fact that the fuel-injection racks associated to the flame holder rings are double. Each of the racks possesses a particular delivery coefficient. The two fuel-injection racks are fed simultaneously in order to obtain the thrust on take-off up to a moderate altitude, of the order of 12 to 15 km. As from this altitude, the after-burner governor progressively reduces the inlet of fuel to the rack with high delivery coefficient, in order finally to cancel it for a certain altitude. The injection pressure of the rack with low delivery coefficient is increased progressively in proportion to the reduction of the delivery on the large rack.

This solution has the advantage of permitting flights at very high altitudes.

FIGURE 13 shows an example of embodiment wherein the two racks 25, 26 are concentric and inject the fuel in counter-current as indicated previously. The rack 25 with low delivery coefficient is situated inside the rack 26 with high delivery coefficient.

The injection of fuel to the small rack is effected through the intermediary of cartridges 27 (FIGURE 14) effecting the securing between the two racks and the necessary tightness at the piercing of the injection orifices 28. The large rack 26 possesses its own injection orifices 29.

It is possible to conceive a double rack in one single piece, drawn in the hot state by a known process.

FIGURES 15 and 16 give two possible modifications of the double injection rack. In these two examples, the rack 26 with high delivery coefficient injects in counter-current, whereas the rack 25 with low coefficient of delivery injects inside the flame-holder rings.

Tests have shown that the injection of small quantities of fuel inside the rings gives a very satisfactory combustion stability at altitude.

We claim:

1. A combustion device with wide operating range for a reaction propulsion unit comprising, in combination at least one annular flame holder of V section having apertures formed at the point of said V section, a first annular injection rack situated within said flame holder and distinct from but fastened to said flame holder by releasable means, said first annular rack having injection orifices delivering fuel in an upstream direction through said apertures of the associated flame holder, and a second injection rack of the same annular type mounted upstream from said flame holder so as to wash said flame holder in the wake generated by said second rack.

2. A combustion device according to claim 1, wherein said first annular injection rack situated within said annular flame holder of V section is constituted by a manifold forming at least one circular segment slidably mounted, with minimum clearance, in a plurality of bored fasteners which are pivoted on said flame holder along longitudinal axes, whereby said flame holder freely expands under heat action without applying substantial forces on said first rack, which is so protected against vibration and local failure.

3. A combustion device with wide operating range for a reaction propulsion unit comprising, in combination at least one annular flame holder of V section having apertures formed at the point of said V section, a first annular injection rack situated within said flame holder and distinct from but fastened to said flame holder by releasable means, said first annular rack having two separate conduit means equipped with different injection orifices, a first series of larger orifices being oriented in an upstream direction and injecting a larger delivery through said apertures of the associated flame holder, and a second series of smaller orifices being oriented toward the interior of said V section and injecting a smaller delivery, and a second injection rack of the same annular type mounted upstream said flame holder so as to wash said flame holder in the wake generated by said second rack.

(References on following page)

References Cited in the file of this patent

UNITED STATES PATENTS

| | | |
|---|---|---|
| 2,520,388 | Earl | Aug. 29, 1950 |
| 2,529,506 | Lloyd | Nov. 14, 1950 |
| 2,679,137 | Probert | May 25, 1954 |
| 2,701,444 | Day | Feb. 8, 1955 |
| 2,793,495 | Karcher | May 28, 1957 |
| 2,882,679 | Karcher | Apr. 21, 1959 |
| 2,927,423 | Wisniowski | Mar. 8, 1960 |
| 2,951,341 | Henning | Sept. 6, 1960 |
| 2,984,970 | Bertaux | May 23, 1961 |

FOREIGN PATENTS

| | | |
|---|---|---|
| 702,752 | Great Britain | Jan. 20, 1954 |